C. C. JONES.
PROCESS OF EXTRACTING IRON FROM ITS ORE.
APPLICATION FILED MAY 13, 1919.
1,319,589.
Patented Oct. 21, 1919.
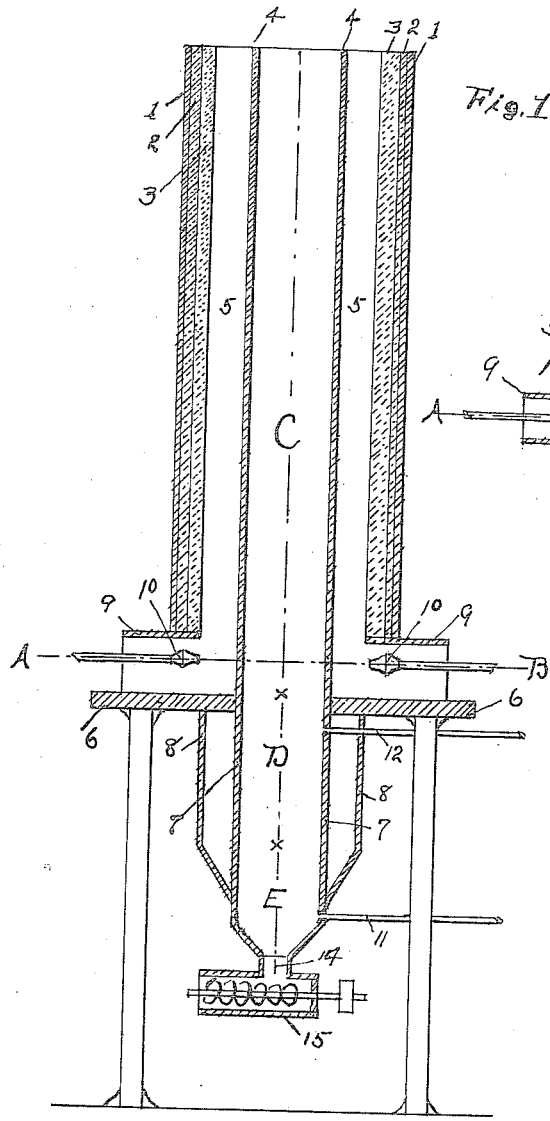
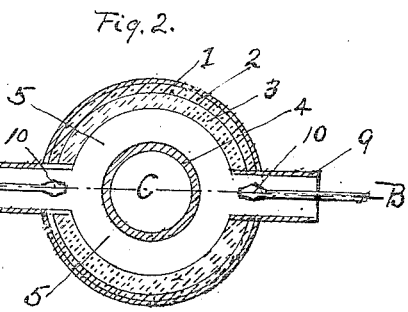
WITNESSES:
C. N. McWilliams
Wm. H. Brintnall
INVENTOR
Charles Colcock Jones

UNITED STATES PATENT OFFICE.

CHARLES COLCOCK JONES, OF LOS ANGELES, CALIFORNIA.

PROCESS OF EXTRACTING IRON FROM ITS ORE.

1,319,589.      Specification of Letters Patent.      Patented Oct. 21, 1919.

Application filed May 13, 1919. Serial No. 296,930.

*To all whom it may concern:*

Be it known that I, CHARLES COLCOCK JONES, a citizen of the United States, residing at Los Angeles, in the county of Los Angeles and State of California, have invented new and useful Improvements in Processes of Extracting Iron from its Ores, of which the following is a specification.

This invention relates to a process of reducing iron direct from iron ores without first converting them into pig iron in the iron-blast furnace.

This invention is essentially a method of reducing to the metallic state a descending column of crushed, heated, iron ore, carburizing the reduced iron and cooling the same in an ascending column of natural gas, all done in a continuous operation, under the exclusion of air and without the addition of solid carbon to the charge for a reducing agent.

I am aware that attempts have been made to produce iron sponge by means of solid carbon, or by gas in various ways, but my improvement in these processes consists in the use of natural gas, or a hydrocarbon gas of a similar composition to natural gas, alone as a reducing, carburizing and cooling agent, wherein the gas performs the following functions: On entering the furnace at the bottom of the column of descending ore and reduced ore it acts as a cooling agent, upon reaching in its upward course the temperature at which carbon deposits from natural gas or hydrocarbon gas it carburizes the reduced ore, continuing rising it acts as a reducing agent in the descending column of ore, which ore is heated to the proper temperature of reduction by means external to and out of direct contact with the ore.

A furnace for carrying out this method of producing iron from its ores without fusing or smelting the same is illustrated in the annexed drawings where;

Figure 1 shows a vertical section through the diameter of the furnace and Fig. 2 shows a horizontal section on line A—B.

The furnace consists of an exterior vertical metal shell or stack 1, lined with a layer of heat insulating material 2, and fire brick 3. This exterior stack 1 is not connected with but completely surrounds the interior vertical stack 4, made of refractory material or metal pipes or plates, with an annular heat and flame space 5 between the exterior and interior stacks.

The exterior and interior stacks are supported by a suitable mantle plate 6, which closes the annular heating space 5 at its bottom, but through which mantle plate 6 the interior stack 4 is prolonged downward into the cooling portion 7 of stack, which is surrounded by an air or water jacket 8. At or near the base of the exterior stack 1, just above mantle plate 6, are one or more ports or openings 9, for gas or oil burners 10. One or more inlet pipes 11 and 12, leading into the interior stack 7, are for the admission thereto of natural gas, or artificial hydrocarbon gas of a similar composition to natural gas. 14 is an outlet for delivering the reduced, carburized and cooled ore through a screw feed 15 or other mechanical device directly to an electric melting and refining furnace, or to a receptacle for storage.

The illustration of the furnace is intended to be diagrammatic only, as the essential and novel steps of the process may be carried out in furnaces of other designs, and is not limited to use with the furnace shown.

The operation of the furnace and the processes involved are divisible into three zones or stages in which the several reactions are going on continuously and contemporaneously. The first zone or stage "C" is in the interior stack 4 from the top of the furnace down to the point of highest temperature opposite the gas or oil burners 10.

The second zone or stage "D" is the upper part of the cooling section of the interior stack, just below zone "C", in which the reduced iron from zone "C" is carburized.

The third zone or stage "E" is the final cooling zone before removal of the iron for refining to steel.

The first stage comprises heating to the temperature necessary for reduction of the contained metal, the column of broken iron ore in the interior stack 4 by conduction through the walls from externally applied heat in the annular space 5 derived from burning natural gas or oil at the burners 10, and reduction of the oxids of iron to the metallic state in the descending column of ore by reason of the deoxidizing action of an ascending column of natural gas or other hydrocarbon gas introduced into the interior stack 4 at the gas inlets 11 and 12.

This reduction to the metallic state of the contained iron is accomplished without the addition to the charge of any solid carbon or fluxes and at a temperature less than fusing, under the exclusion of air in stack 4 in which the ascending gases form an effectual seal against the entrance of air into the system.

The column of ore in 4 primarily receives its heat by conduction through the walls and according as the reducing action is endothermic or exothermic the heat in the annular space 5 can be controlled and regulated to maintain the column of ore at the temperature necessary for reduction, which temperature ranges from 250 to 1,000 degrees centigrade.

The second stage takes place in the upper part of the cooling section of furnace 7, during which the reduced ore from the first stage, passing downwardly through the furnace, cools from the temperature of reduction down to about 150 degrees centigrade and in the course of which cooling carburization of the reduced iron sponge takes place by reason of the well known property of natural gas of depositing carbon when highly heated.

The reduced ore from the first stage is in the form of a more or less porous iron sponge as it enters the cooling portion 7 of the furnace and in an ideal condition for receiving and combining with the deposited carbon when the equilibrium temperature is reached in the cooling of the sponge at which carbon will be deposited from the gas and be retained by the iron sponge, thereby altering it to a more fusible compound of iron and carbon and less easily oxidized than pure sponge.

A further correlated reaction due to the deposition of carbon from the natural gas in stage two, and of an intensifying reducing effect in the first stage, is the enrichment of the reducing gas by reason of the greater proportion of hydrogen in it due to the removal of a portion of the carbon of the original natural gas in carburizing the iron sponge.

Ordinarily an ample amount of gas for all purposes in the furnace can be supplied from the gas inlet pipe 11 at the bottom of the furnace, and the purpose of the auxiliary gas inlet pipe 12, just at or below the point of highest temperature in 4, is to correct at any time any irregularities in the working of the furnace should a clogging of the gas flow take place from inlet 11 on account of an excess deposit of carbon between the pieces of carburized iron sponge, and by manipulating the two gas inlets 11 and 12 a proper gas equilibrium can be restored or maintained.

The final or third stage, before drawing the reduced carburized product, is a further cooling of it from contact with the column of gas entering at 11, which gas is always supplied under pressure at ordinary temperatures.

When necessary the air or water jacket 8 can be used to supplement the cooling of the iron product by gas.

I claim:

1. A zonal process of reducing iron ore by means of natural gas, or a hydrocarbon gas of similar composition, comprising heating a descending column of broken ore, under the exclusion of air, to the temperature necessary for reduction of the contained metal and less than fusing, passing the column of ore, under the exclusion of air, through this heating and reducing zone in intimate contact with an ascending column of natural gas, or other gaseous hydrocarbon of similar composition, thereby reducing the iron wholly or in part to the metallic state by the action of the gas in this zone; continuing passing the descending column of reduced or partly reduced iron, under the exclusion of air, into and through a lower cooling and carburizing zone, in intimate contact with the ascending column of natural or other hydrocarbon gas, passing the descending column of reduced and carburized iron through the final cooling zone in the ascending column of gas, and delivering the product from the furnace without allowing air to enter the furnace.

2. A continuous process of reducing iron ores and carburizing the reduced or partly reduced product by means of natural gas, in a suitable furnace, comprising heating the crushed ore to the temperature of reduction of the contained metal and less than fusing by means external to the walls surrounding the column of ore, maintaining the column of ore at the necessary temperature by these external means while reducing the contained iron by the action of an ascending column of natural gas, passing the reduced ore into the cooling stage in which at the critical temperature, attained by the natural gas from contact with the hot reduced metal, the natural gas deposits carbon in the reduced ore, carburizes the reduced ore and alters it from the ordinary iron sponge to a carburized product of a different character; cooling further the carburized iron in the ascending column of natural gas below the temperature of carburization by the gas, and removing it from the furnace for treatment in electric or other furnaces.

3. The herein described process of reducing, carburizing, and cooling iron ore, which comprises heating the ore externally while causing it to pass progressively through a furnace, and passing natural or other suitable hydrocarbon gas through the heated ore in a direction opposite to that in which the ore passes through the furnace, thereby effecting a more or less complete reduction of the ore, carburizing the reduced ore and making a product in which in the final melting or refining treatment the combined carbon will effect the complete reduction of the contained metal.

4. The herein described process of reducing and carburizing iron ore, comprising heating a descending column of ore by means external to it, and contemporaneously subjecting the column of descending ore to the action of an ascending column of natural gas or hydrocarbon gas of similar composition, which is introduced at its normal temperature at the bottom of the ore column, thereby effecting the more or less complete reduction of the iron ore and its subsequent carburization and cooling.

In testimony whereof I have hereunto set my hand at Los Angeles, California, this 3rd day of May, 1919.

CHARLES COLCOCK JONES.

In presence of—
GILBERT A. McELROY,
ETHEL M. DE BOLT.